(12) United States Patent
Zarubica et al.

(10) Patent No.: US 10,348,423 B1
(45) Date of Patent: Jul. 9, 2019

(54) CALCULATING A VIRTUAL BORESIGHT VECTOR OF AN ANTENNA ARRAY

(71) Applicant: L3 Technologies, Inc., New York, NY (US)

(72) Inventors: Radivoje Zarubica, Salt Lake City, UT (US); Samuel C. Kingston, Salt Lake City, UT (US); Merle L. Keller, Salt Lake City, UT (US)

(73) Assignee: L3 TECHNOLOGIES, INC., New York, NY (US)

( * ) Notice: Subject to any disclaimer, the term of this patent is extended or adjusted under 35 U.S.C. 154(b) by 0 days.

(21) Appl. No.: 15/782,732

(22) Filed: Oct. 12, 2017

(51) Int. Cl.
*H04B 17/21* (2015.01)
*G01S 3/64* (2006.01)
*G01S 3/14* (2006.01)
*G01S 7/491* (2006.01)
*H04B 7/06* (2006.01)

(52) U.S. Cl.
CPC .............. *H04B 17/21* (2015.01); *G01S 3/143* (2013.01); *G01S 3/64* (2013.01); *G01S 7/4915* (2013.01); *H04B 7/0634* (2013.01)

(58) Field of Classification Search
CPC ..... H04B 17/21; H04B 7/0634; G01S 7/4915; G01S 3/143; G01S 3/64
See application file for complete search history.

(56) References Cited

U.S. PATENT DOCUMENTS

| | | | |
|---|---|---|---|
| 6,646,598 B1 * | 11/2003 | Timothy | ............... G01S 7/4026 342/359 |
| 9,967,081 B2 * | 5/2018 | Yang | .................... H04B 7/0413 |

* cited by examiner

*Primary Examiner* — Ian N Moore
*Assistant Examiner* — Rushil Parimal Sampat
(74) *Attorney, Agent, or Firm* — Kirton McConkie; Brian Tucker (57) ABSTRACT

A virtual boresight vector for an antenna array can be calculated. The virtual boresight vector defines the direction an antenna array is pointing and can be used to ensure that angle of arrival measurements are performed with high accuracy. The virtual boresighting process can include positioning a calibration node at two different locations in order to obtain different covariance matrices. With the covariance matrices and based on knowing the angle between the two locations, an angle of arrival node can perform a process to calculate a precise angle between the antenna array and the second location.

20 Claims, 7 Drawing Sheets

CALCULATING A VIRTUAL BORESIGHT VECTOR OF AN ANTENNA ARRAY

CROSS-REFERENCE TO RELATED APPLICATIONS

N/A

BACKGROUND

Geolocation refers to techniques for determining the geographic location of an object. Various types of geolocation exist. The present invention is applicable to environments where the object to be geolocated emits a signal. In such environments, various measurements can be performed on the received signal to estimate the location of the emitting object. For example, a receiver can perform angle (or direction) of arrival techniques to estimate the angle between the emitting object and the boresight vector of the antenna's receiver.

Angle of arrival techniques are often performed by detecting phase differences at a number of antennas that receive the signal emitted by the object. In such systems, each antenna is coupled to the system via various analog RF components (e.g., LNAs, up/down converters, cables, etc.) whose characteristics vary with temperature and frequency (i.e., they will cause an unknown phase rotation between the antenna and the angle of arrival system). The characteristics will also vary between components of the same type. For example, multiple RF cables, even if they have the same length, will rarely cause the same phase shift to a signal. Due to these variations and inconsistencies, it can be difficult to estimate the angle of arrival with high precision.

Generally, there are two options for addressing the phase rotation caused by these RF components. First, specialized RF components that minimize the effects of temperature and frequency on the system can be employed. However, such components are expensive and still do not fully compensate for temperature- and frequency-based variations. Second, specialized measuring equipment can be employed to measure the phase rotation caused by the RF components. However, this type of calibration would require disconnecting the antenna array from the angle of arrival system and is therefore unfeasible in many scenarios.

Antenna boresighting refers to determining the direction (or vector) in which the antenna is pointing. In the case of a single antenna, the boresight vector is the direction of maximum gain relative to a reference frame. Therefore to identify the boresight vector of a single antenna, the antenna can be steered until the gain of the received signal is maximized. The orientation of the antenna at this point would define the reference plane for angle of arrival purposes. However, with an antenna array, each antenna's boresight vector will typically be pointed in a slightly different direction thereby making this boresighting technique unsuitable, or at least inaccurate, for antenna arrays. In particular, it is typically necessary to use the plane in which the elements of the antenna array are situated as the reference plane for angle of arrival purposes. However, there is no guarantee that the boresight vector of a particular element will be orthogonal to this plane.

Figure 1:
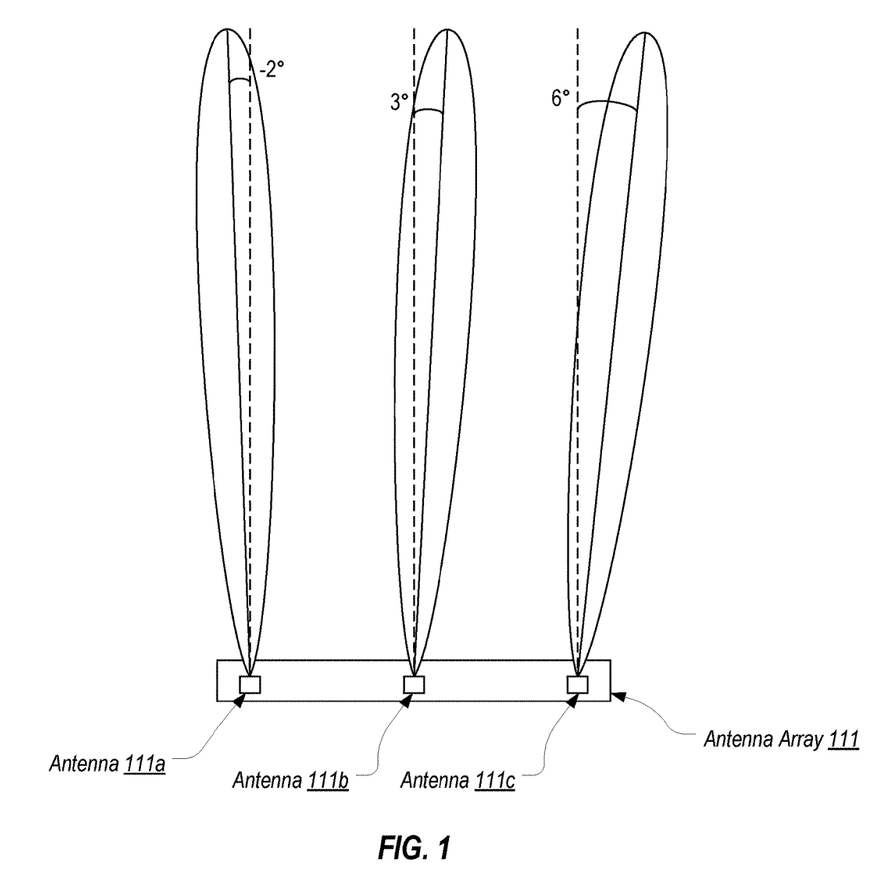
FIG. 1 illustrates an example of how the boresight vectors of antennas in an antenna array can be misaligned.

FIG. 1 provides a simple diagram to illustrate this issue. In this figure, an antenna array 111 is assumed to have three antennas 111a-111c arranged along a plane. The dashed lines represent a line perpendicular to this plane. As shown, the maximum gain of each antenna is offset slightly at −2°, 3°, and 6° respectively from this perpendicular line. Therefore, if the boresight vector of any of antennas 111a-111c is chosen as the boresight vector of antenna array 111 (hereinafter "the virtual boresight vector"), an error would be caused in any subsequently performed angle of arrival calculations due to the fact that antenna array 111 will not be pointing in the direction that it is assumed to be pointing.

BRIEF SUMMARY

The present invention is generally directed to systems, methods, and computer program products for calculating a virtual boresight vector for an antenna array. When an antenna array is used to perform angle of arrival measurements, the present invention can be employed to calculate the virtual boresight vector for the antenna array to ensure that the angle of arrival measurements can be calculated with high accuracy. The present invention enables this virtual boresight vector to be calculated even after the antenna array has been installed.

In one embodiment, the present invention is implemented by an angle of arrival node in an angle of arrival system as a method for determining a virtual boresight vector of an antenna array. The angle of arrival node can generate a first measured covariance matrix for a signal emitted by a calibration node that is positioned at an arbitrary location and a second measured covariance matrix for a signal emitted by the calibration node that is positioned at a permanent location different from the arbitrary location. The angle of arrival node can then generate a measured difference covariance matrix from the first and second measured covariance matrices. An angle difference between an angle of the arbitrary location relative to an antenna array of the angle of arrival node and an angle of the permanent location relative to the antenna array can also be determined. For each of a number of assumed angles of the permanent location relative to the antenna array, the angle of arrival node can: calculate a first estimated covariance matrix for the assumed angle; calculate a second estimated covariance matrix for a corresponding angle that is offset from the assumed angle; and generate an estimated difference covariance matrix from the first and second estimated covariance matrices. The angle of arrival node can then compare the measured difference covariance matrix to each estimated difference covariance matrix to identify one of the estimated difference covariance matrices that most closely matches the measured difference covariance matrix. Finally, the angle of arrival node can calculate, from the assumed angle that corresponds with the identified estimated difference covariance matrix, an angle between the antenna array and the calibration node.

In another embodiment, the present invention is implemented as a method for determining a virtual boresight vector of an antenna array. A calibration node is positioned at an arbitrary location. While the calibration node is positioned at the arbitrary location, an angle of arrival node is caused to generate a first measured covariance matrix for a signal emitted by the calibration node. The calibration node is then positioned at a permanent location different from the arbitrary location. While the calibration node is positioned at the permanent location, the angle of arrival node is caused to generate a second measured covariance matrix for a signal emitted by the calibration node. Input is then provided to the angle of arrival node that identifies an angle difference between an angle of the arbitrary location relative to an antenna array of the angle of arrival node and an angle of the permanent location relative to the antenna array.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "virtual boresight vector" should be construed as a vector that is orthogonal to the plane in which antennas of an antenna array are positioned. The point where the virtual boresight vector is determined to intersect the plane of the antenna array is somewhat arbitrary, and any point on the plane could be selected as the (0, 0) coordinates for use in the angle of arrival calculations. Importantly, because of its orthogonality, the virtual boresight vector defines the coordinate system for the antennas in the antenna array that can be used in angle of arrival calculations.

The term "covariance matrix" should be construed in accordance with its typical meaning in angle of arrival techniques. The term "measured covariance matrix" should be construed as a covariance matrix that represents differences in the phase of a signal received at each antenna in an antenna array. The term "estimated covariance matrix" should be construed as a covariance matrix that is calculated based on a known/assumed angle of arrival (as opposed to being generated from measured phases).

The term "measured difference covariance matrix" should be construed as a covariance matrix that represents differences between two measured covariance matrices where each measured covariance matrix corresponds to a received signal that was emitted from a different location. The term "estimated difference covariance matrix" should be construed as a covariance matrix that represents differences between two estimated covariance matrices where each estimated covariance matrix corresponds to a different assumed angle of arrival.

The techniques of the present invention may be particularly beneficial in environments where an antenna array is mounted in a relatively inaccessible location. For example, an antenna array could be mounted to the mast of an aircraft carrier for the purpose of detecting the location of aircraft relative to the aircraft carrier as they approach for landing or may be mounted to the side of a building for the purpose of detecting the location of vehicles on streets below. However, the present invention can be used in any situation where it is desirable to precisely determine the virtual boresight vector of an antenna array.

By way of example only, the techniques of the present invention could be used in embodiments of the self-calibrating angle of arrival system disclosed in pending U.S. patent application Ser. No. 15/787,548 which is incorporated herein by reference. The effectiveness of the self-calibration techniques disclosed in that application are largely dependent on precisely knowing the angle between a calibration node and the virtual boresight vector of the antenna array. Because the present invention enables the virtual boresight vector to be calculated precisely (as opposed to assuming the direction of the virtual boresight vector based on the boresight vector of one antenna), this angle can in turn be determined precisely.

Figure 2:
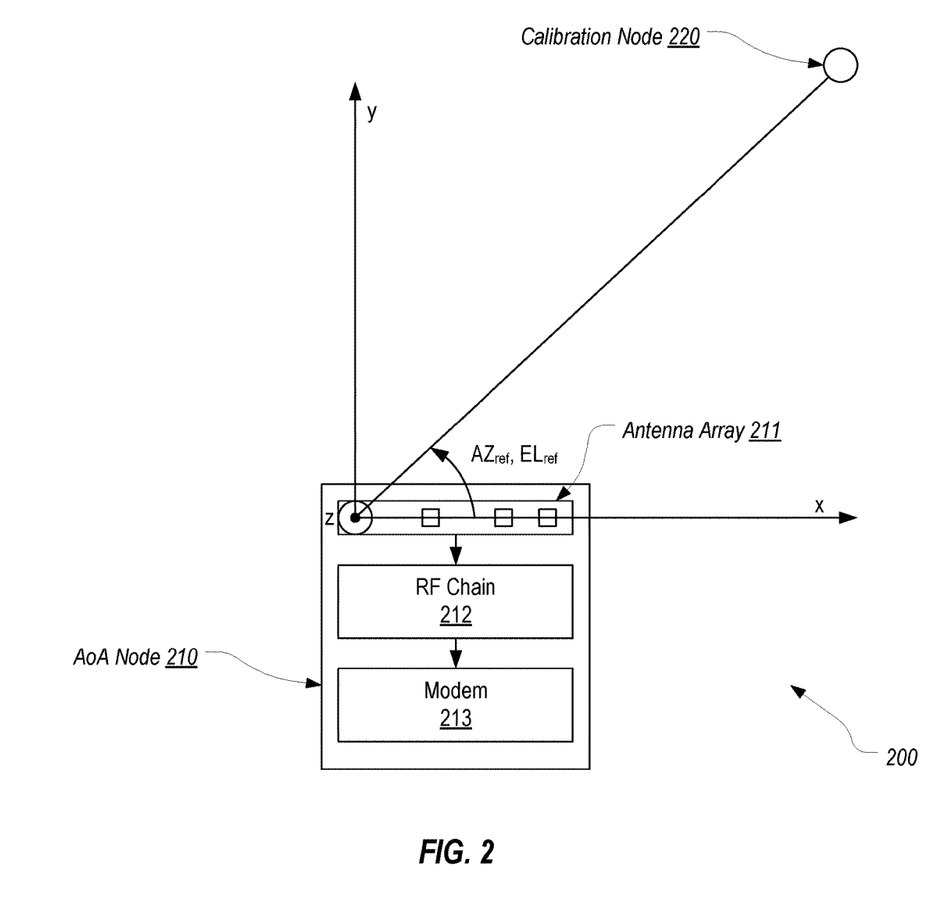
FIG. 2 illustrates an example angle of arrival system in which the present invention can be implemented.

FIG. 2 illustrates the general architecture of an angle of arrival system 200 in which the present invention can be implemented. Angle of arrival system 200 includes an angle of arrival node 210 that includes an antenna array 211 and a modem 213 that is configured to determine the angle of arrival of a signal emitted from another node. Antenna array 211 is coupled to modem 213 via an RF chain 212. Angle of arrival system 200 also includes a calibration node 220 whose purpose will be described in detail below.

Figure 2A:
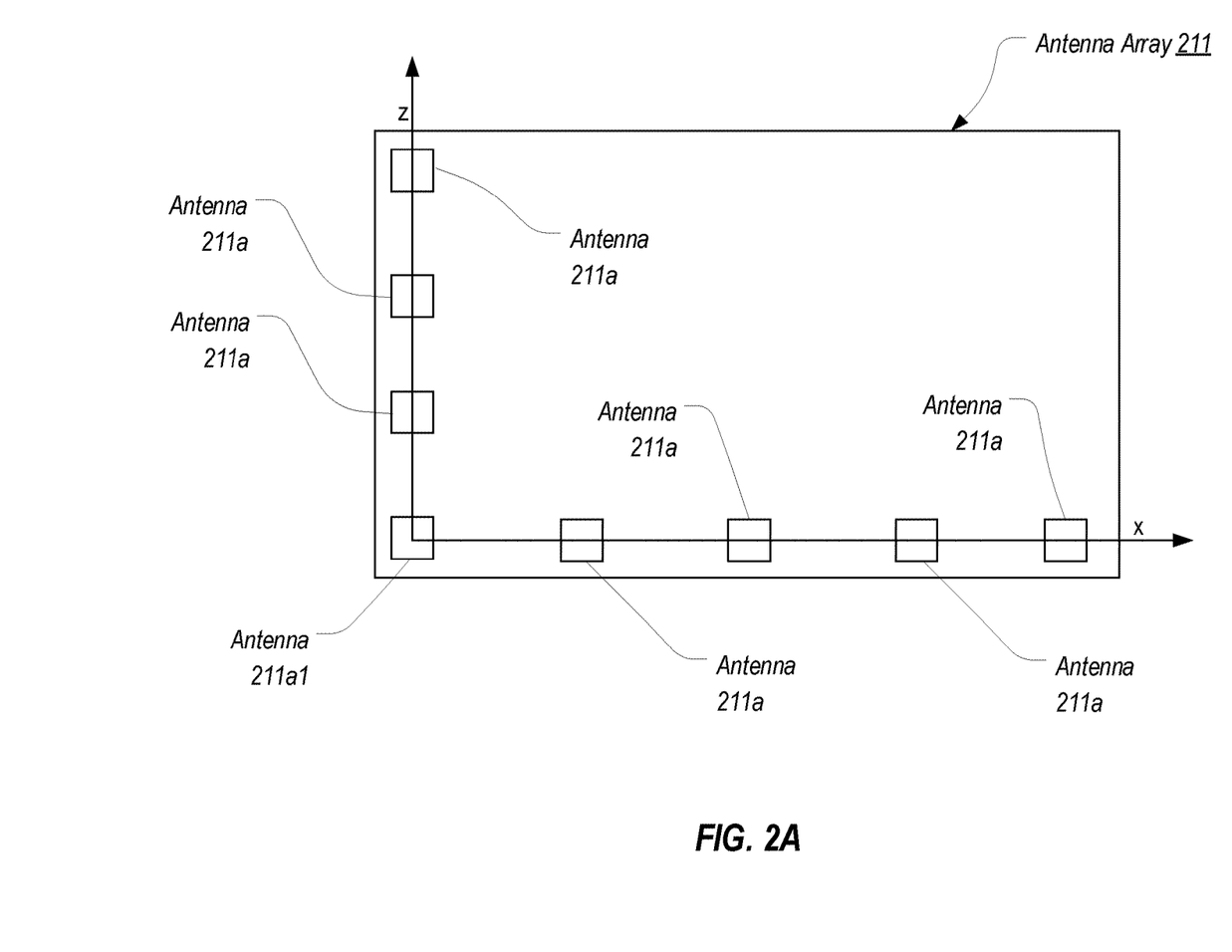
FIG. 2A illustrates an example of an antenna array having a number of antennas positioned along the x-z plane.

As is better shown in FIG. 2A, antenna array 211 is assumed to include eight antennas 211a that are arranged on a plane defined by the x and z axes. It will also be assumed that the y axis intersects this plane at the location of antenna 211a1. Again, the location where the y axis intersects the x-z plane is arbitrary, and modem 213 could be configured to calculate angle of arrival measurements using a different location for the y axis. Also, antenna array 211 could include any other number of antennas that are arranged in any suitable configuration, and therefore the present invention should not be limited by any particular arrangement of antennas within antenna array 211.

In any case, based on these assumptions, the y axis defines the direction that antenna array 211 is actually pointing (i.e., its virtual boresight vector). A primary problem that the present invention addresses is determining the precise direction of this virtual boresight vector once antenna array 211 is mounted since the virtual boresight vector defines the orientation of the x-z plane of antenna array 211 and therefore the relative coordinates of antennas 211a. Modem 213 must know this orientation of antenna array 211 to perform angle of arrival measurements. Although modem 213 could be manually configured with this orientation, there is no guarantee that antenna array 211 will be mounted to match the manually configured orientation. This is especially true when antenna array 211 is mounted in inaccessible locations. The present invention therefore provides a way for modem 213 to precisely determine the virtual boresight vector of antenna array 211 after antenna array 211 is mounted. Knowing precisely where antenna array 211 is pointing will enable modem 213 to accurately perform the self-calibration techniques described in U.S. patent application Ser. No. 15/787,548. It is noted, however, that accurately determining the virtual boresight vector of antenna array 211 would enhance any other angle of arrival techniques.

Figure 3A:
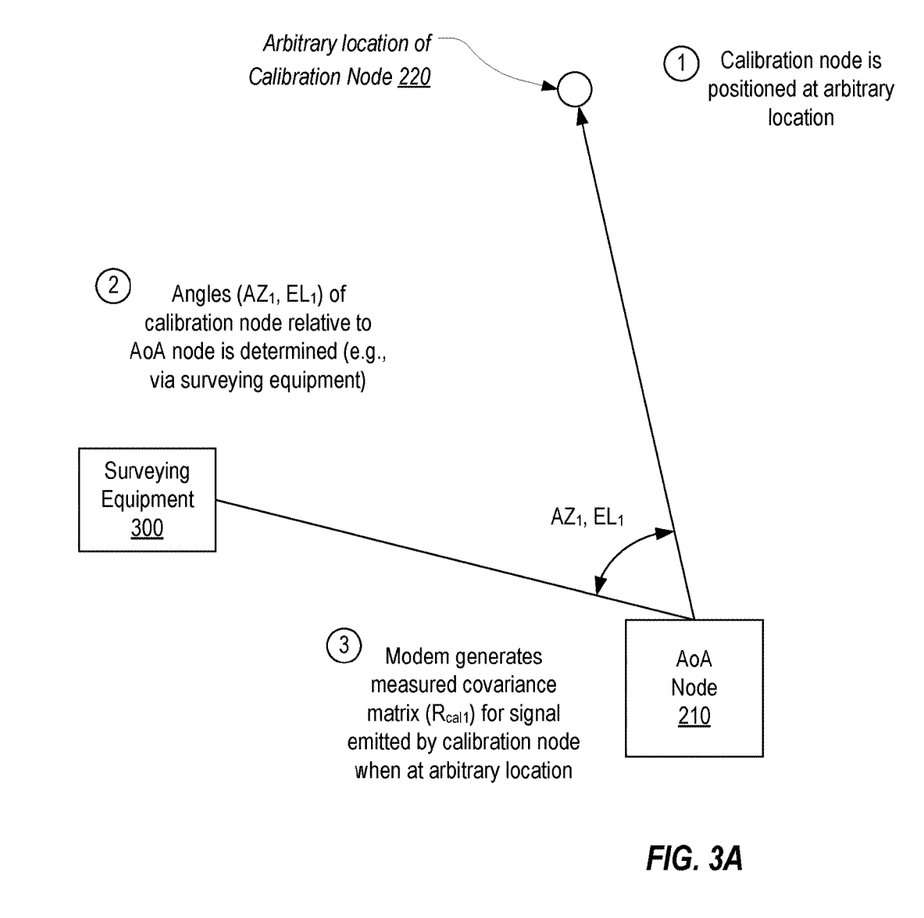
FIGS. 3A-3C illustrate steps of an example process for calculating a virtual boresight vector of an antenna array.
Figure 3B:
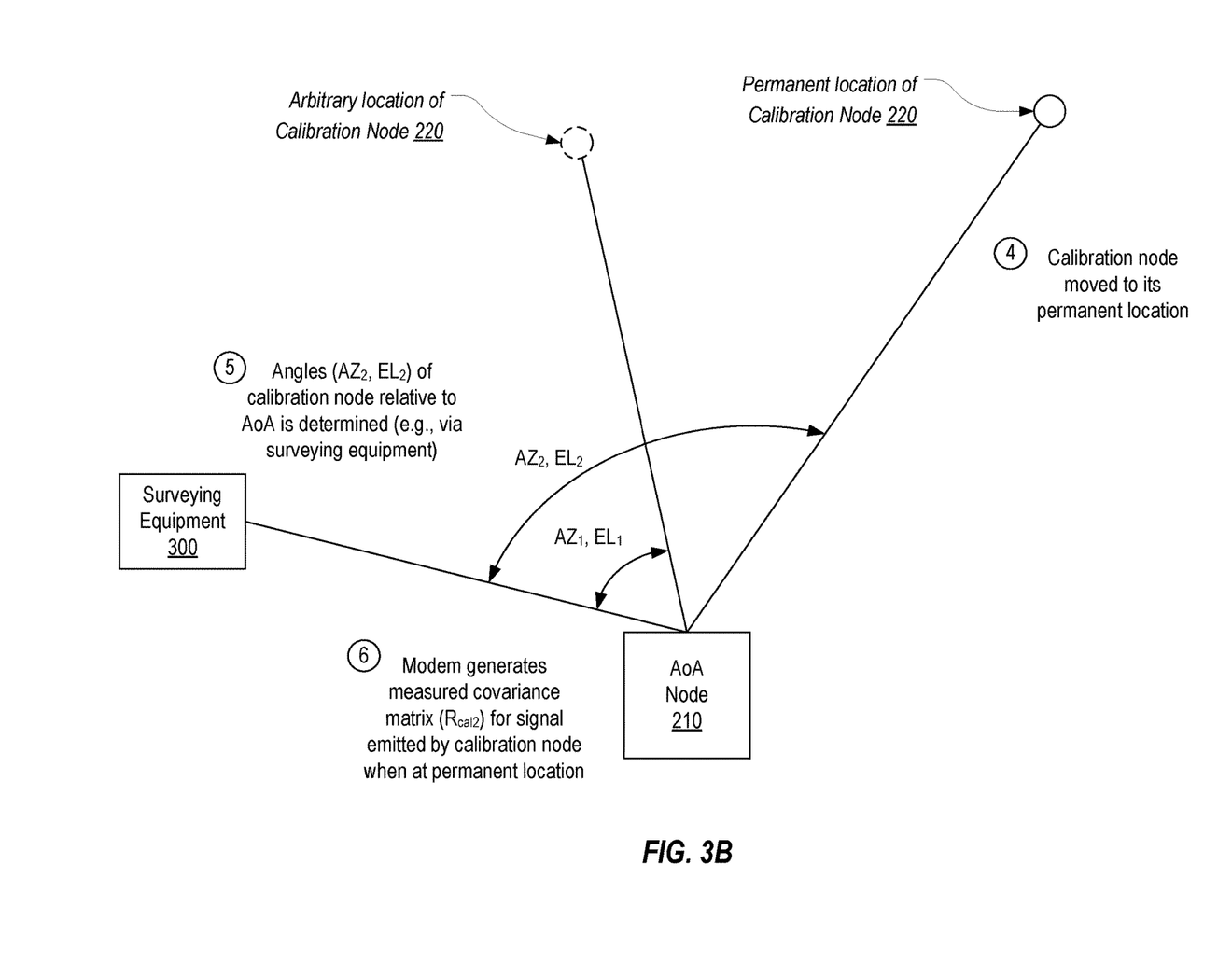
Figure 3C:
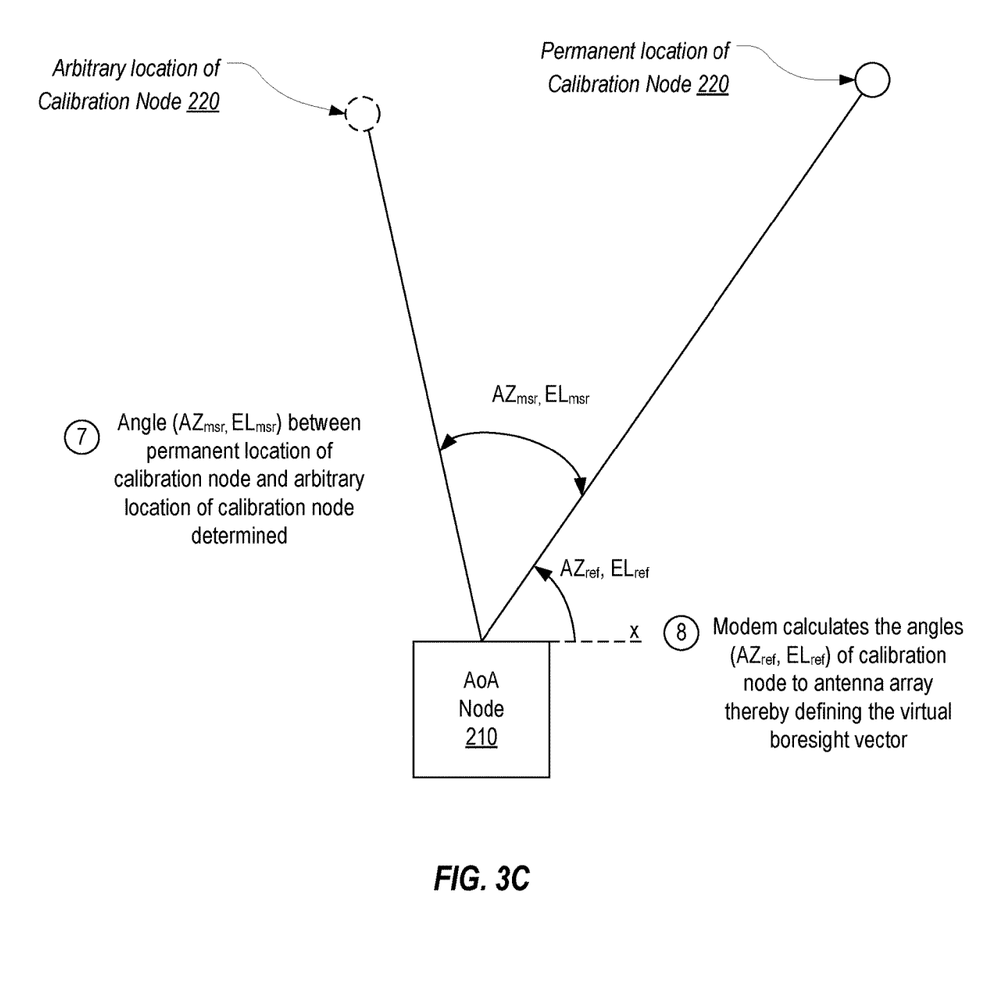

FIGS. 3A-3C illustrate the general steps of a process that can be performed in angle of arrival system 200 to determine the virtual boresight vector of antenna array 211. To perform this process, angle of arrival node 210 can be positioned in its desired location (i.e., the location where angle of arrival node 210 will be when performing angle of arrival techniques to geolocate objects). For example, angle of arrival node 210 could be mounted to a mast, building, or other structure so that the field of view of antenna array 211 will encompass the area where objects to be geolocated will be.

It is important to note that, although the location of angle of arrival node 210 will be fixed and known at this point, the exact direction in which antenna array 211 is pointing (i.e., its virtual boresight vector) will remain unknown. The steps depicted in FIGS. 3A-3C can be performed to determine this virtual boresight vector.

In step 1 shown in FIG. 3A, calibration node 220 can be positioned at an arbitrary location. This "arbitrary location" can be any location within the field of view of antenna array 211 that is different from the permanent location of calibration node 220. The "permanent location" should be understood as the location where calibration node 220 will be positioned during normal operation of angle of arrival system 200 (e.g., the location of calibration node 220 when performing the self-calibration techniques described in U.S. patent application Ser. No. 15/787,548). For reasons that will be addressed below, the arbitrary location can preferably be selected so that it is not symmetrical, or near symmetrical, with the permanent location.

In step 2, the azimuth and elevation angles relative to the location of angle of arrival node 210 and the arbitrary location of calibration node 220 can be determined. By way of example, surveying equipment 300 can be positioned at a third location where angle of arrival node 210 and calibration node 220 are both visible. As shown in FIG. 3A, the angles $AZ_1$ and $EZ_1$ formed by the vector between angle of arrival node 210 and surveying equipment 300 and the vector between angle of arrival node 210 and calibration node 220 can be determined using any known technique.

In step 3 and while calibration node 220 is still at the arbitrary location, calibration node 220 can be caused to emit a signal, and angle of arrival node 210 can generate a measured covariance matrix $R_{cal1}$ to represent the differences in the phase of the signal received at antennas 211a. As one of skill in the art would understand how to calculate a covariance matrix, this process will not be described.

Turning to FIG. 3B, in step 4, calibration node 220 is moved to its permanent location. Then, in step 5, the azimuth and elevation angles, $AZ_2$ and $EL_2$, relative to the location of angle of arrival node 210 and the permanent location of calibration node 220 can be determined. In step 6, calibration node 220 can be caused to emit a signal, and angle of arrival node 210 can generate a corresponding measured covariance matrix $R_{cal2}$. Modem 213 can be configured to receive the angles $AZ_1$, $AZ_2$, $EL_1$, and $EL_2$ as input (or to receive the differences between these angles) once they have been determined. Accordingly, after step 6, modem 213 will know the measured covariance matrices $R_{cal1}$ and $R_{cal2}$ corresponding to the arbitrary and permanent locations of calibration node 220. If not calculated externally and then input, the angle differences between the intended and arbitrary locations of calibration node 220, $AZ_{msr}$ and $EL_{msr}$, can be calculated by modem 213 as:

$$AZ_{msr} = AZ_2 - AZ_1$$
$$EL_{msr} = EL_2 - EL_1$$

as represented in step 7 of FIG. 3C. Finally, in step 8, modem 213 can use the measured covariance matrices, $R_{cal1}$ and $R_{cal2}$, the angle differences, $AZ_{msr}$ and $EL_{msr}$, and the known locations of each antenna 211a, $P_{ix}$, $P_{iy}$, $P_{iz}$, to calculate the angles, $AZ_{ref}$, $EL_{ref}$, between antenna array 211 and the permanent location of calibration node 220. Because the angles, $AZ_{ref}$, $EL_{ref}$, are relative to the plane of antenna array 211, they define the virtual boresight vector of antenna array 211 (i.e., the virtual boresight vector is orthogonal to the plane).

Prior to discussing the process modem 213 performs in step 8 to calculate $AZ_{ref}$ and $EL_{ref}$ a simplified overview will be provided. Based on knowing the measured covariance matrices for two locations separated by a known angle, modem 213 iteratively generates estimated covariance matrices for two assumed locations that are separated by $AZ_{ref}$ and $EL_{ref}$. Modem 213 then compares differences between the measured covariance matrices and differences between each set of estimated covariance matrices to identify which set most closely matches the measured covariance matrices. The identified set will define the angles $AZ_{ref}$, $EL_{ref}$ and therefore the virtual boresight vector for antenna array 211.

The details of this process are as follows. First, modem 213 calculates the measured difference covariance matrix as:

$$R_{diff} = R_{cal2} \cdot R^*_{cal1}$$

where · denotes an element-by-element product (as opposed to a matrix product), and * represents conjugation of each element in the matrix. The measured difference covariance matrix, $R_{diff}$, therefore represents the differences between the two measured covariance matrices, $R_{cal1}$ and $R_{cal2}$.

Next, modem 213 can generate the estimated difference covariance matrix, $R_{diff\_j}$, for each of a number of assumed angles, $AZ_j$, $EL_j$, for the permanent location of calibration node 220. In other words, $AZ_j$ and $EL_j$ can represent "guesses" as to what $AZ_{ref}$ and $EL_{ref}$ may actually be. To minimize processing, the assumed values of $AZ_j$ and $EL_j$ can be confined to angles that would appear within the field of view of antenna array 211 or even to an area within which calibration node 220 would certainly be located. For example, if it is known that the permanent location will be around 75° Az and 10° El relative to antenna array 211, modem 213 can confine the values of j to 750±5° and 10°±5° respectively.

For each set of values of $AZ_j$ and $EL_j$, modem 213 can generate a first estimated covariance matrix, $R_{cal2}j$, which represents the differences in phases that would exist when a signal arrives at the assumed angle $AZ_j$, $EL_j$. Modem 213 can also generate a second estimated covariance matrix, $R_{cal2j}$, which represents the differences in phases that would exist when a signal arrives at the assumed offset angle $AZ_j - AZ_{msr}$, $EL_j - EL_{msr}$. These estimated covariance matrices are calculated as follows:

$$R_{cal1j} = G_{cal1j} \cdot G^*_{cal1j}, \quad R_{cal2j} = G_{cal2j} \cdot G_{cal2j}$$

where $$G_{cal1j} = \begin{bmatrix} g_{cal1\_1} \\ g_{cal1\_2} \\ \vdots \\ g_{cal1\_i} \\ g_{cal1\_N} \end{bmatrix}, \quad G^*_{cal1j} = [g^*_{cal1\_1} \; g^*_{cal1\_2} \; \cdots \; g^*_{cal1\_i} \; g^*_{cal1\_N}]$$

and $$G_{cal2j} = \begin{bmatrix} g_{cal2\_1} \\ g_{cal2\_2} \\ \vdots \\ g_{cal2\_i} \\ g_{cal2\_N} \end{bmatrix}, G^*_{cal2j} = [g^*_{cal2\_1}\ g^*_{cal2\_2}\ \cdots\ g^*_{cal2\_i}\ g^*_{cal2\_N}]$$

Each element $g_{cal1\_i}$ in the $G_{cal1j}$ vector is calculated as:

$$g_{cal1\_i} = e^{-j2\pi(P_{ix},P_{iy},P_{iz})\cdot(u_{cal1\_x},u_{cal1\_y},u_{cal1\_z})}$$

where ($P_{ix}$, $P_{iy}$, $P_{iz}$) is the location of the $i^{th}$ antenna element while ($u_{cal1\_x}$, $u_{cal1\_y}$, $u_{cal1\_z}$) is the vector pointing to the calibration node at the arbitrary location calculated as:

$$(u_{cal1\_x}, u_{cal1\_y}, u_{cal1\_z}) = (\cos(EL_j - EL_{msr})\cos(AZ_j - AZ_{msr}),$$

$$\cos(EL_j - EL_{msr})\sin(AZ_j - AZ_{msr}),$$

$$\sin(EL_j - EL_{msr}))$$

Similarly, each element $g_{cal2\_i}$ in the $G_{cal2\_j}$ vector is calculated as:

$$g_{cal2\_i} = e^{-j2\pi(P_{ix},P_{iy},P_{iz})\cdot(u_{cal2\_x},u_{cal2\_y},u_{cal2\_z})}$$

where ($P_{ix}$, $P_{iy}$, $P_{iz}$) is the location of the $i^{th}$ antenna element while ($u_{cal2\_x}$, $u_{cal2\_y}$, $u_{cal2\_z}$) is the vector pointing to the calibration node at the permanent location calculated as:

$$(u_{cal2\_x}, u_{cal2\_y}, u_{cal2\_z}) = (\cos(EL_j)\cos(AZ_j),$$

$$\cos(EL_j)\sin(AZ_j),$$

$$\sin(EL_j))$$

Modem 213 can then calculate the estimated difference covariance matrix, $R_{diff\_j}$, for each assumed angle as:

$$R_{diff\_j} = R_{cal2j} \cdot R^*_{cal1j}$$

where · denotes an element-by-element product (as opposed to a matrix product) and * represents conjugation of each element in the matrix.

The result of the processing will be a number of instances of $R_{diff\_j}$, where each instance corresponds to a different assumed angle for the permanent location of calibration node 220. Modem 213 can then compare the measured difference covariance matrix, $R_{diff}$, to each instance of the estimated difference covariance matrix, $R_{diff\_j}$, to determine which instance is most similar. The values of $AZ_j$ and $EL_j$ that yield an estimated difference covariance matrix which produces a minimal mean square error E in accordance with the equation below will allow the values of $AZ_{ref}$ and $EL_{ref}$ to be determined.

$$E = (\text{angle}(R_{diff}) - \text{angle}(R_{diff\_j}))^2$$

For reasons that are beyond the scope of this discussion, this process will yield two minimums for the mean square error. A first minimum will occur at the angle to the arbitrary location, but the second minimum will not correspond directly with the angle to the permanent location. However, the second minimum relates to the angle to the permanent location in that it is symmetric around 90°. Therefore, modem 213 can identify the angle where the second minimum occurs and subtract it from 180° to obtain the values of $AZ_{ref}$ and $EL_{ref}$. To facilitate determining which minimum corresponds with the angle to the arbitrary location, the arbitrary location can be selected so that it is not symmetric with the permanent location.

In summary, modem 213 assumes what the angle of arrival from the permanent location of calibration node 220 might be, calculates what the covariance matrix would be at that assumed angle and at the corresponding assumed offset angle, and then compares this calculated information to measured information to identify the best match.

Figure 4:
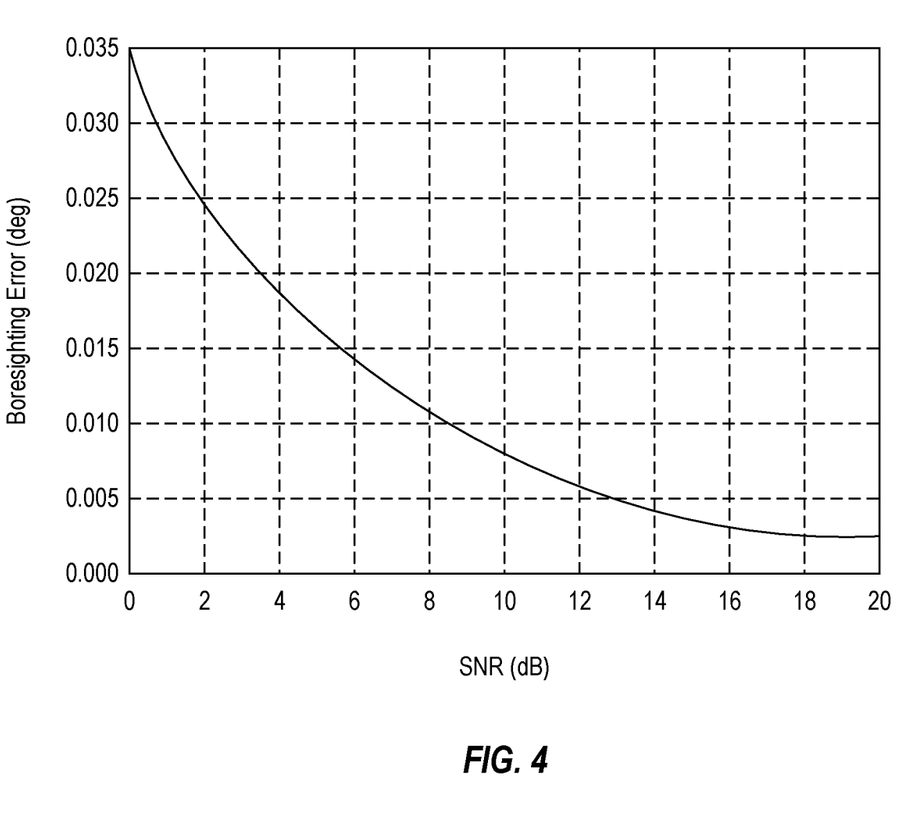
FIG. 4 illustrates how the virtual boresight vector can be calculated with very high accuracy by positioning the calibration node close to the angle of arrival node.

The performance of the above-described boresighting algorithm was tested at various signal-to-noise (SNR) ratios. FIG. 4 illustrates the boresighting error with respect to the SNR. As is seen, with a moderately high SNR (e.g., >10 dB), the boresighting accuracy is very high (<0.01°). Because calibration node 220 can typically be positioned very close to angle of arrival node 210 which will result in a high SNR, the present invention allows the virtual boresight vector of antenna array 211 to be determined with very high precision. This will allow angle of arrival measurements to be made with high accuracy and may facilitate the self-calibration techniques disclosed in U.S. patent application Ser. No. 15/787,548.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed by an angle of arrival node in an angle of arrival system, for determining a virtual boresight vector of an antenna array, the method comprising:
   generating a first measured covariance matrix for a signal emitted by a calibration node that is positioned at an arbitrary location;
   generating a second measured covariance matrix for a signal emitted by the calibration node that is positioned at a permanent location different from the arbitrary location;
   generating a measured difference covariance matrix from the first and second measured covariance matrices;
   determining an angle difference between an angle of the arbitrary location relative to an antenna array of the angle of arrival node and an angle of the permanent location relative to the antenna array;
   for each of a number of assumed angles of the permanent location relative to the antenna array:
      calculating a first estimated covariance matrix for the assumed angle;
      calculating a second estimated covariance matrix for a corresponding angle that is offset from the assumed angle; and
      generating an estimated difference covariance matrix from the first and second estimated covariance matrices;
   comparing the measured difference covariance matrix to each estimated difference covariance matrix to identify one of the estimated difference covariance matrices that most closely matches the measured difference covariance matrix; and
   calculating, from the assumed angle that corresponds with the identified estimated difference covariance matrix, an angle between the antenna array and the calibration node.

2. The method of claim 1, wherein the measured difference covariance matrix comprises an element-by-element product of the second measured covariance matrix and the conjugate of first measured covariance matrix.

3. The method of claim 1, wherein each estimated difference covariance matrix comprises an element-by-element product of the corresponding second estimated covariance matrix and the conjugate of the corresponding first estimated covariance matrix.

4. The method of claim 1, wherein determining the angle difference comprises one of:
receiving input of the angle difference; or
calculating the angle difference from input that defines the angle of the arbitrary location relative to the antenna array and the angle of the permanent location relative to the antenna array.

5. The method of claim 4, wherein the angle of the arbitrary location relative to the antenna array and the angle of the permanent location relative to the antenna array are relative to a third location.

6. The method of claim 5, wherein the third location comprises a location of surveying equipment used to determine the angle of the arbitrary location relative to the antenna array and the angle of the permanent location relative to the antenna array.

7. The method of claim 1, wherein the corresponding angle is offset from the assumed angle by the angle difference.

8. The method of claim 1, wherein comparing the measured difference covariance matrix to each estimated difference covariance matrix comprises calculating a mean square error between the measured difference covariance matrix and each estimated difference covariance matrix.

9. The method of claim 8, wherein identifying one of the estimated difference covariance matrices that most closely matches the measured difference covariance matrix comprises identifying one of the estimated difference covariance matrices that produces a minimal mean square error.

10. The method of claim 9, wherein more than one of the estimated difference covariance matrices produces a minimal mean square error, and wherein identifying one of the estimated difference covariance matrices that most closely matches the measured difference covariance matrix further comprises determining which of the estimated difference covariance matrices that produces a minimal mean square error does not correspond with the arbitrary location.

11. The method of claim 10, wherein identifying one of the estimated difference covariance matrices that most closely matches the measured difference covariance matrix further comprises identifying the assumed angle that corresponds to the estimated difference covariance matrix that produces a minimal mean square error that does not correspond with the arbitrary location.

12. The method of claim 11, wherein calculating the angle between the antenna array and the calibration node comprises subtracting the assumed angle from 180°.

13. The method of claim 1, further comprising:
employing the calculated angle between the antenna array and the calibration node to perform an angle of arrival measurement.

14. A method for determining a virtual boresight vector of an antenna array, the method comprising:
positioning a calibration node at an arbitrary location;
while the calibration node is positioned at the arbitrary location, causing an angle of arrival node to generate a first measured covariance matrix for a signal emitted by the calibration node;
positioning the calibration node at a permanent location different from the arbitrary location;
while the calibration node is positioned at the permanent location, causing the angle of arrival node to generate a second measured covariance matrix for a signal emitted by the calibration node;
providing input to the angle of arrival node that identifies an angle difference between an angle of the arbitrary location relative to an antenna array of the angle of arrival node and an angle of the permanent location relative to the antenna array; and
calculate, from the first and second measured covariance matrixes and the input, an angle between the antenna array and the calibration node at the permanent location.

15. The method of claim 14, further comprising:
while the calibration node is positioned at the arbitrary location, employing survey equipment at a third location to determine the angle of the arbitrary location relative to the antenna array; and
while the calibration node is positioned at the permanent location, employing the survey equipment to determine the angle of the permanent location relative to the antenna array.

16. The method of claim 15, wherein the input identifies the angle of the arbitrary location relative to the antenna array and the angle of the permanent location relative to the antenna array.

17. An angle of arrival system comprising:
an angle of arrival node having an antenna array and a modem coupled to the antenna array; and
a calibration node that is configured to emit a signal;
wherein the modem is configured to perform the following:
generate a first measured covariance matrix for the signal when the calibration node is positioned at an arbitrary location;
generate a second measured covariance matrix for the signal when the calibration node is positioned at a permanent location different from the arbitrary location;
generate a measured difference covariance matrix from the first and second measured covariance matrices;
determine an angle difference between an angle of the arbitrary location relative to the antenna array and an angle of the permanent location relative to the antenna array;
for each of a number of assumed angles of the permanent location relative to the antenna array:
calculate a first estimated covariance matrix for the assumed angle;
calculate a second estimated covariance matrix for a corresponding angle that is offset from the assumed angle; and
generate an estimated difference covariance matrix from the first and second estimated covariance matrices;
compare the measured difference covariance matrix to each estimated difference covariance matrix to identify one of the estimated difference covariance matrices that most closely matches the measured difference covariance matrix; and
calculate, from the assumed angle that corresponds with the identified estimated difference covariance matrix, an angle between the antenna array and the calibration node.

18. The angle of arrival system of claim 17, wherein the corresponding angle is offset from the assumed angle by the angle difference.

19. The angle of arrival system of claim 17, wherein comparing the measured difference covariance matrix to each estimated difference covariance matrix comprises calculating a mean square error between the measured difference covariance matrix and each estimated difference covariance matrix.

20. The angle of arrival system of claim 17, wherein identifying one of the estimated difference covariance matrices that most closely matches the measured difference covariance matrix comprises identifying, from among multiple estimated difference covariance matrices that produces a minimal mean square error, an estimated difference covariance matrix that does not correspond with the arbitrary location.

* * * * *